:::
United States Patent [19]

Suzuki et al.

[11] Patent Number: 4,611,910
[45] Date of Patent: Sep. 16, 1986

[54] RANGE FINDER

[75] Inventors: Kiziro Suzuki, Hamura; Takashi Tsutsumi, Tokyo; Shotaro Yokoyama; Takashi Nishibe, both of Yokosuka, all of Japan

[73] Assignees: Konishiroku Photo Industry Co., Ltd.; Fuji Electric Company Ltd.; Fuji Electric Corporate Research and Development Ltd., all of Japan

[21] Appl. No.: 607,208

[22] Filed: May 4, 1984

[30] Foreign Application Priority Data

May 8, 1983 [JP] Japan .................................. 58-80416

[51] Int. Cl.$^4$ ............................ G01C 3/18; G03B 3/00
[52] U.S. Cl. ........................................ 356/1; 354/408; 250/201
[58] Field of Search .................... 356/1; 354/400, 402, 354/404, 405, 406, 408; 250/201 R, 201 PF

[56] References Cited

U.S. PATENT DOCUMENTS

| 3,967,056 | 6/1976 | Yuta et al. | 354/402 |
| 4,252,425 | 2/1981 | Aoki et al. | 354/402 |
| 4,298,259 | 11/1981 | Aoki et al. | 354/402 |
| 4,542,289 | 9/1985 | Yokoyama et al. | 354/402 |

FOREIGN PATENT DOCUMENTS 2142497 1/1985 United Kingdom ............... 354/408

Primary Examiner—Russell E. Adams
Attorney, Agent, or Firm—Jordan B. Bierman

[57] ABSTRACT

A range finder wherein a photocurrent in a predetermined number of light receiving elements corresponding to images formed by a first and a second optical devices for receiving light reflected by an object through different light paths on a focal plane, arranged in first and second light receiving element trains is quantized with reference to the maximum photocurrent in the light receiving elements by a first and a second quantizing devices, and wherein the corelation between the first and second quantizing devices are used for determining the distance to be measured.

3 Claims, 9 Drawing Figures

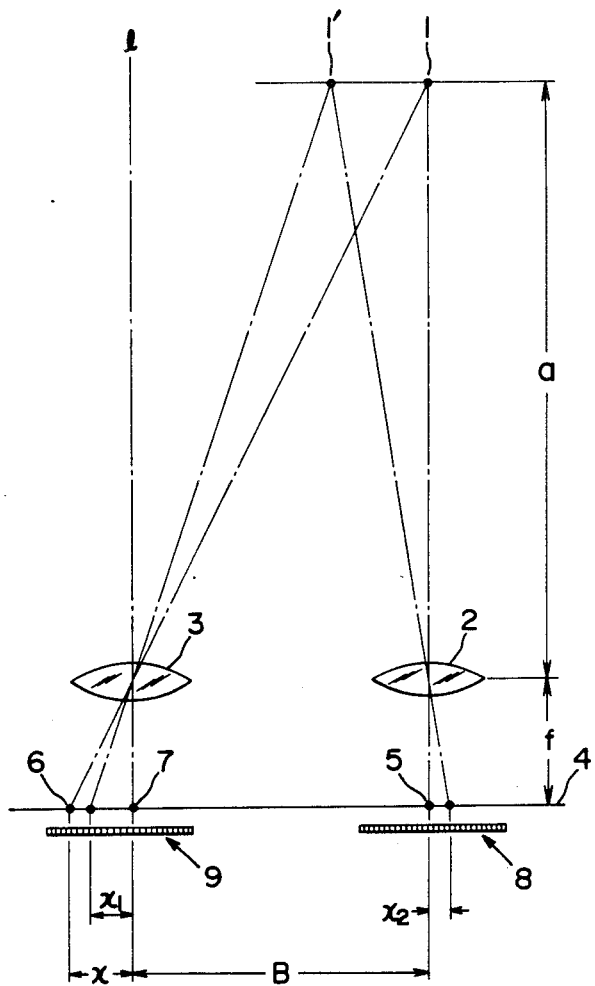
F I G. I
PRIOR ART

RANGE FINDER

BACKGROUND OF THE INVENTION

1. Field of the Invention

The present invention relates to a range finder suitable for the use in, for example, an automatic focussing camera.

2. Description of the Prior Art

FIG. 1 in the accompanying drawings shows the measurement principles of the range finder of the kind referred to. Numeral 1 denotes an object, 2 and 3 denote a pair of lenses, and 4 denotes a focal plane of the lenses 2 and 3. Numerals 5, 6 and 7 denote images, and 8 and 9 denote a first and a second light receiving element trains.

The object 1 forms images 5 and 6 on the focal plane 4 respectively through the lenses 2 and 3. If the object 1 is positioned at infinity, the light from the object 1 incides along a light path l and forms an image 7 on the focal plane 4. Accordingly, if the distance x between the images 6 and 7 is detected, the distance a between the object 1 and focal plane 4 can be obtained from the wellknown trigonometry as follows:

$$a = f \cdot B / x \tag{1}$$

Here f is the focal length of the lenses 2 and 3 and B is the base line length. In order to obtain clear images on the focal plane 4, f is selected to be $f << a$.

In obtaining the value x in the expression (1), the image 5 formed through the lens 2 is used instead of the image 7 of the object at infinity formed through the lens 3. In more detail, the first and second light receiving element trains 8 and 9 are arranged in the vicinity of the image forming positions on the focal plane 4, and the difference between the distance between the image patterns of the images 5 and 6 which are obtained by these light receiving element trains 8 and 9 and the base line length B is adopted as the value x.

In FIG. 1, for easy understanding of the measurement principles, the optical system and light receiving element trains are arranged to form a right-angled triangle with the corner at the image 5 right-angled. In fact, it is actually possible to position the object 1 in various other positional relationships with respect to the optical system and light receiving element trains. In any event, it makes no substantially changes whether the position of the object 1 is in front of one of the light receiving element trains or on either side thereof. For example, the object 1' forms images on the focal plane 4 at positions displaced from the both ends of the base line length B by $x_1$ and $x_2$ respectively. Accordingly, if the x is replaced by $x_1 + x_2$ in the expression (1), the distance a can be obtained by the similar procedure.

The structure illustrated in FIG. 1 will now be described in detail. FIGS. 2(a) and 2(b) are block diagrams which show the practical structure for obtaining the distance x.

Referring to FIG. 2(a), numerals 8 and 9 denote the light receiving element trains as illustrated in FIG. 1, numerals 10 and 11 denote binary-coding circuits for binary-coding the output from the light receiving element trains 8 and 9, and numerals 12 and 13 denote shift registers of the same bit number as the light receiving element trains 8 and 9. Numeral 14 denotes a coincidence detection circuit train, 15 denotes a counter, and 16 denotes a discrimination circuit. The respective light receiving elements in the light receiving element trains 8 and 9 provide output in the analogue form, which is binary-coded by an appropriate threshold level in the binary-coding circuit trains 10 and 11, and then stored in the shift registers 12 and 13. In this instance, it is not always necessary to form the both 12 and 13 shift registers. As shown in FIG. 2(b), if one of them, 12 in the illustrated example, is formed to be a latch circuit, the other, 13 in this example, may be desirably constituted by a shift register.

Referring to FIG. 2(a) again, the outputs from the respective bits of the shift registers 12 and 13 are applied on into the coincidence detection circuit train 14 in the preset combination. Each circuit in the coincidence detection circuit train 14, on detecting the coincidence between the two inputs, makes "1", otherwise on detecting no coincidence therebetween, makes "0".

The outputs "1" are countered by the counter 15 and the counted number is supplied to the discrimination circuit 16. The discrimination circuit 16, after storing the counted number, makes the shift register 12 and/or 13 to shift by one bit and read the output from the counter 15, which is stored by memory means (not shown). This series of shifting of the shift registers 12 and 13 and reading/memorizing of the counted number on the counter 15 is repeated by the predetermined number. Then the largest value in the counted number stored in the memory means is obtained. This value indicates the case where the images by the light receiving element trains 8 and 9 are most coincided. The number of the shiftings of the shift registers 12 and/or 13 from the initial state to the maximum coincidence number represents x.

It should be noted that the number of bits of the coincidence detection circuit is not necessarily identical with the number of the elements of the respective light receiving elements. Further, if the respective light receiving elements do not have the same number of elements, the shifting number x can be obtained by the similar procedure only by making a minor modification to the circuit structure. For example, by comparing only a part of the shift register in accordance with the arrangement of the optical system and light receiving elements, or in the right-angled type by a successive comparison while shifting only one of the shift registers with the other supplied with no shift pulses or while supplying shift pulses to the both shift registers alternately.

A conventional circuit for binary-coding the output from the light receiving elements is illustrated in FIG. 3. In this figure, only one light receiving element is exemplified for easy understanding. If a predetermined number of light receiving elements of this type are provided, a corresponding circuit to the light receiving element train can be formed. Numeral 17 denotes a photodiode which constitutes the light receiving element, numerals 18 and 19 denote switching transistors, 20 denotes a capacitor and 21 denotes an inverter.

In the operation, at first the switching transistor 18 is turned ON by a CLEAR input to make the capacitor C to discharge. After that, the switching transistor 18 is turned OFF by the CLEAR input and the switching transistor 19 is turned ON by D input. Then photocurrent i which is substantially proportional to the strength of the light flows into the capacitor 20 from the photodiode 17 through the switching transistor 19. When a predetermined time period t has elapsed after the turning ON of the switching transistor 19, the switching transistor 19 is turned OFF by the D input. At this time the capacitor 20 has electric charge of about i×t, therefore the input of the inverter 21 is applied with voltage $V_{in}=$i·t/C. Representing the threshold voltage of the inverter 21 by $V_{th}$, when $V_{in} \geq V_{th}$, the output value of the inverter 21 becomes "0", and when $V_{in} < V_{th}$, the output value of the inverter 21 becomes "1".

Assuming that the power supplying time period of the switching transistor 19 is too long, the capacitor 20 in all the light receiving elements is overcharged so that the input to the inverter 21 exceeds the threshold voltage. To the contrary, assuming that the power supplying time period is too short, the capacitor 20 is charged only insufficiently so that the input to the inverter 21 cannot exceed the threshold voltage. That is, if the time t is not taken into consideration at the time of binary-coding, only one pattern that all output values are "0" or "1" can be obtained. Accordingly, the distance measurement is impossible.

Thus the time t should be determined in consideration of the amount of light accepted by the light receiving element trains, and this kind of control is generally complex. In addition, in the comparison by the binary-coded patterns, correctiveness is apparently lacked due to the shortage of information. However, if the multiplication of information is to usually realized through the A/D conversion of photocurrent, it results in the increase in the manufacturing costs and operation time.

For the above reasons, the conventional range finder of this kind cannot perform a correct distance measurement for a relatively short time period.

SUMMARY OF THE INVENTION

The present invention has been suggested in view of the above defects inherent to the conventional range finder of this kind, therefore a primary object of the present invention is to provide a range finder which can perform a correct distance measurement for a limited time period by a simple structure.

This object of the present invention can be realized by a range finder including a first and a second optical means for receiving light reflected by an object through different light paths so as to form images on a predetermined focal plane, a first and a second light receiving element trains in which a predetermined number of light receiving elements are arranged in correspondence to the images on the focal plane, and a first and a second quantizing means for quantizing the photocurrent in the respective light receiving elements in the first and second light receiving element trains and providing outputs, the correlation between which is used for determining the distance to be measured, characterized in that the first and second quantizing means quantize the photocurrent in the light receiving elements in the first and second light receiving element trains with reference to the maximum photocurrent in the first and second light receiving elements in the first and second light receiving element trains.

The other objects and advantages of the present invention will be apparent in proceeding the description in conjunction with the drawings.

BRIEF DESCRIPTION OF THE DRAWINGS

FIG. 1 is an explanatory view showing the measurement principles of the range finder of the kind referred to;

DESCRIPTION OF THE PREFERRED EMBODIMENTS

Figure 2A:
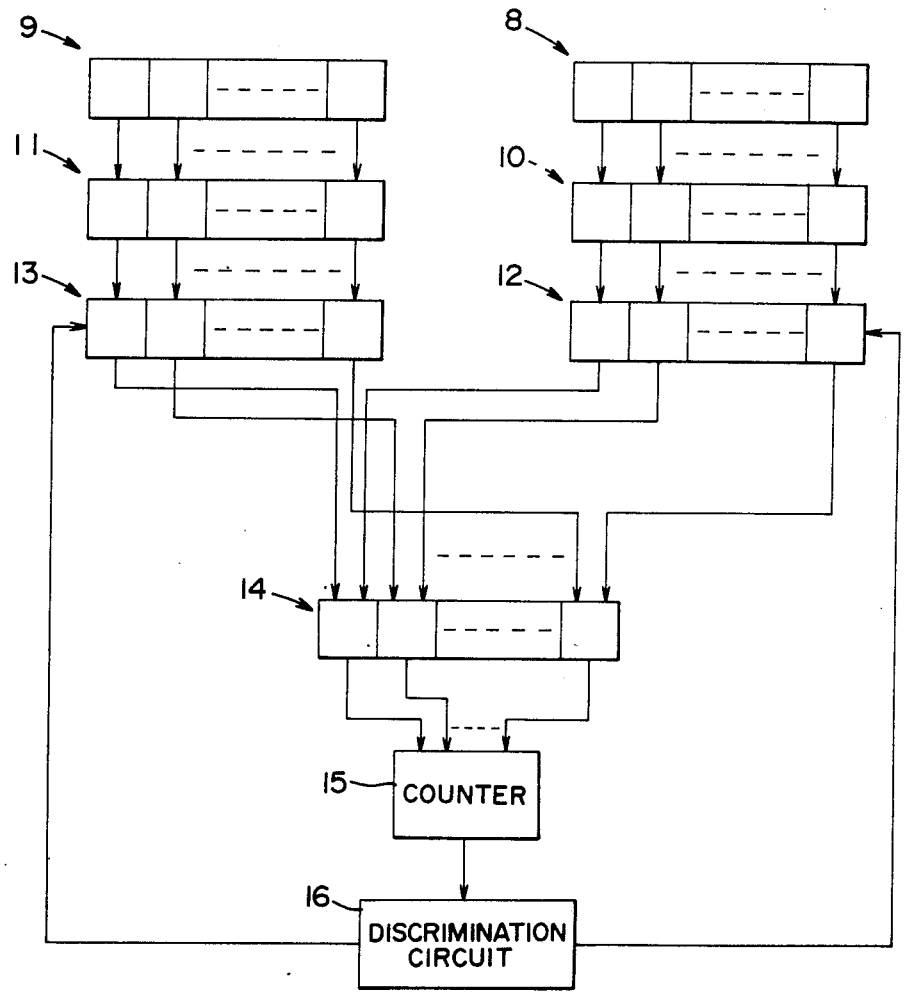
FIG. 2(a) and FIG. 2(b) are block diagrams for showing the structure of a conventional range finder.
Figure 2B:
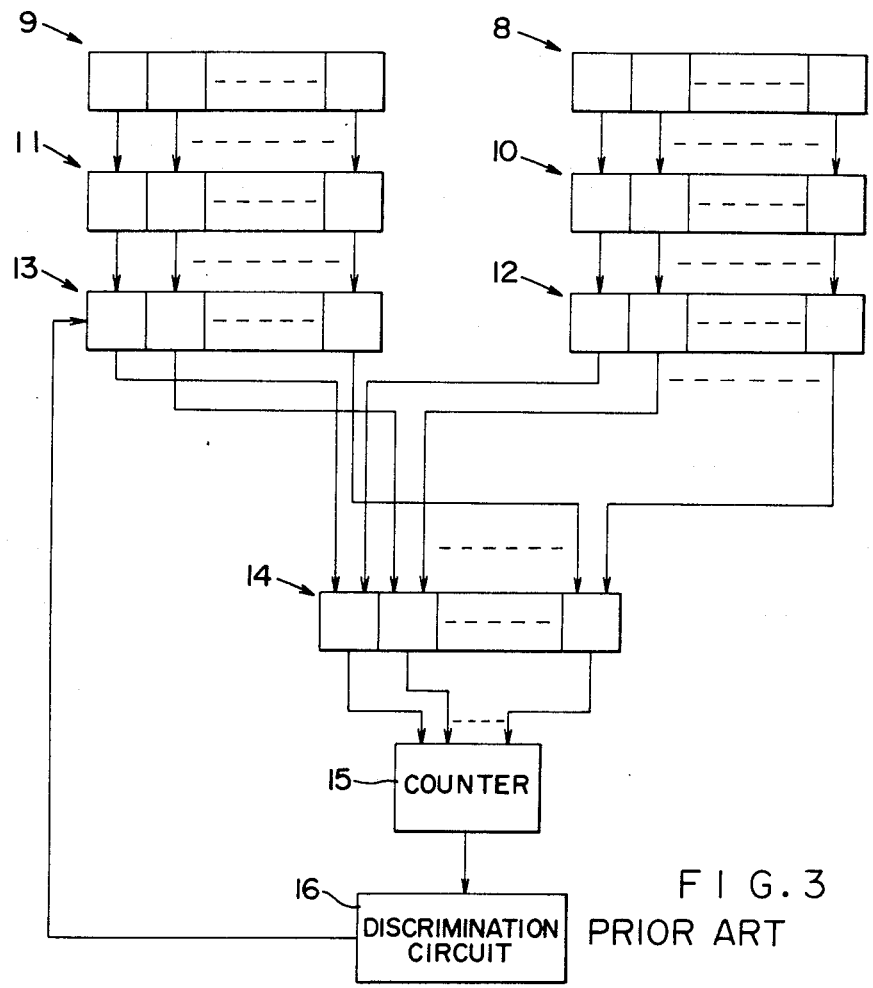

The range finder according to the illustrated embodiment of the present invention is identical with that of FIGS. 1, 2(a) and 2(b) in the basic structure, therefore the description of this part is omitted here for avoiding a repetition.

Figure 3:
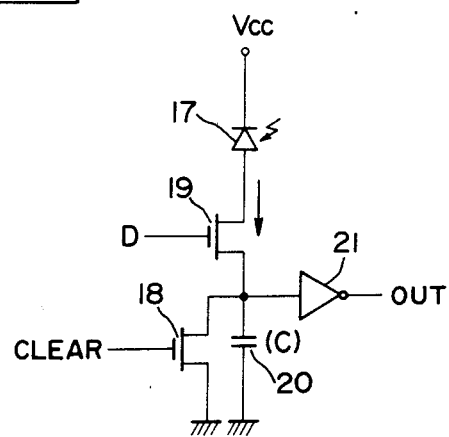
FIG. 3 is a circuit diagram showing a part of circuit in the apparatus shown in FIG. 2.
Figure 4:
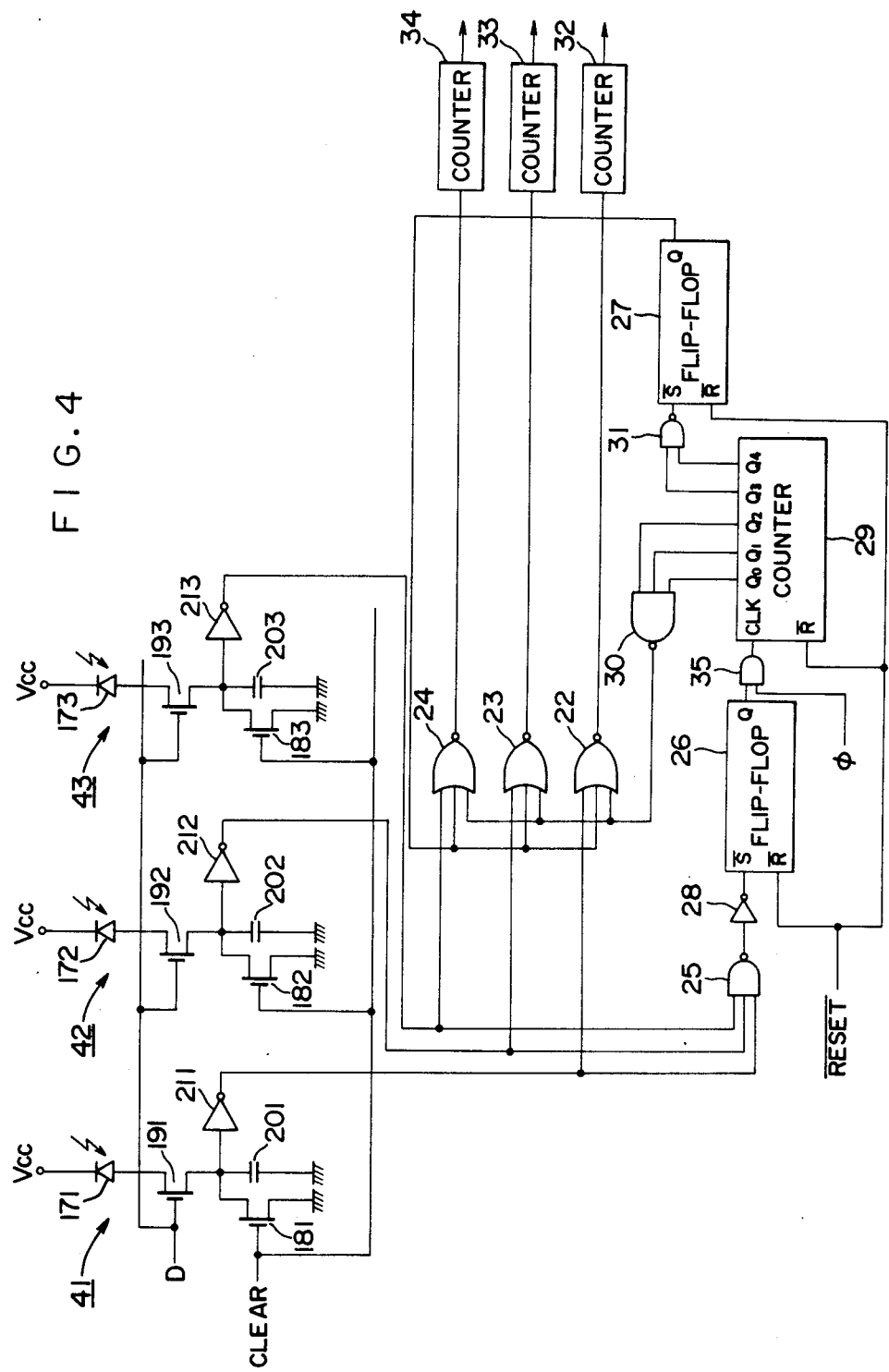
FIG. 4 is a circuit diagram showing an important part of a range finder according to an embodiment of the present invention.

Referring to FIG. 4, in which the circuit part of the range finder according to the present invention is shown, numerals 41 and 43 denote light detection circuits of the same structure as the circuit in FIG. 3. In the illustrated embodiment, the circuits are shown only by three, but the number of the circuits should be coincided with that of the light receiving elements provided in the apparatus.

In these light detection circuits 41 to 43, numerals 171 to 173 denote photodiodes, each being connected at one end to a constant voltage source $V_{cc}$, 181 to 183 and 191 to 193 denote switching transistors (FET), and 201 and 203 denote capacitors. The first group of switching transistors 181 to 183 and the second group of switching transistors 191 to 193 are connected in series respectively and inserted between the photodiodes 171 to 173 and the ground. This first group of transistors 181 to 183 are provided for discharging the capacitors 201 to 203 connected in parallel to these transistors by the CLEAR input, whereas the second group of transistors 191 to 193 are provided for passing and interrupting the photocurrent which flows through each of the photodiodes 171 to 173 by the D input.

Numerals 211 to 213 denote inverters for applying charge voltage of the capacitors 201 to 203. These inverters 201 to 203, also provided with the input level (threshold voltage) by which the output is inverted, functions as a comparator which compares an input voltage to the reference voltage.

The light detection circuits 41 to 43, thus constituted, provide outputs (actually outputs from the inverters 211 to 213) which are given respectively to NOR gates 22 and 24 and also to a NAND gate 25.

Numerals 26 and 27 are flip-flops. When an $\overline{S}$ input is "0", the Q output is set to be "1", and when an $\overline{R}$ input is "0", the Q output is reset to be "0". $\overline{RESET}$ signals are given as the $\overline{R}$ input. The flip-flop 26 receives the output from the NAND gate 25 through an inverter 28 as the $\overline{S}$ input. The Q output thereof constitutes together with a clock input $\phi$ an AND output which is given to a binary counter 29 so as to count up. The binary counter 29 receives the $\overline{RESET}$ signal as the $\overline{R}$ input, and when the $\overline{R}$ input is "0", the respective output $Q_0$ to $Q_4$ are reset to be "0". This binary counter 29 counts the AND output signals which are constituted by the clock input $\phi$ which is given as a CLK input and the Q output from the flip-flop 26. This clock input $\phi$ has a constant or variable time interval in the "1" state and is a pulse signal of a constant width in the "0" state (this pulse signal will be referred to as EV clock hereinafter) as can be clearly seen in FIG. 6. The control of the above time interval is performed by a controller (not shown).

Numeral 30 denotes a NAND gate which receives the outputs $Q_0$ to $Q_2$ from the binary counter 29 and provides outputs to the NOR gates 22 to 24. Numeral 31 denotes another NAND gate which receives the outputs $Q_3$ and $Q_4$ from the binary counter 29 and provides outputs to the flip-flop 27 as the $\overline{S}$ input. The Q output from the flip-flop 27 is given to the NOR gates 22 to 24.

Numerals 32 to 34 are 2-bit binary counters, which count up every time the output from the respective NOR gates 22 to 24 changes from "0" to "1".

It is necessary to increase the number of the NOR gates and binary counters to be provided in accordance with the number of the light receiving elements included in the apparatus.

Next, the circuit operation will be explained.

At first, the switching transistors 181 to 183 are turned ON by the CLEAR input so as to discharge the capacitors 201 to 203. At the same time, the flip-flops 26 and 27 are reset by the $\overline{RESET}$ signal so that the outputs thereof become "0". The $\overline{RESET}$ signal is "0" only at the operation starting and thereafter becomes and remains "1". Accordingly the $\overline{R}$ input to the binary counter 29 becomes "0" at the operation starting, therefore all the outputs $Q_0$ to $Q_4$ are "0". After that, when the output from the flip-flop 26 becomes "1", the clock input $\phi$ is given through an AND gate 35 into the CLK terminal of the binary counter 29.

Then, after the switching transistors 181 to 183 are turned OFF by the CLEAR input, the switching transistors 191 to 193 are turned ON by the D input. By this, the photocurrent in the respective photodiodes 171 to 173 flows into the capacitors 201 to 203 so that the input voltage to the inverters 211 to 213 increases. If any one of the outputs from the inverters 211 to 213 is inverted to "0", the output from the NAND gate 25 is also inverted from "0" to "1". Thus the $\overline{S}$ input to the flip-flop 26 becomes "0" and the Q output thereof becomes "1", therefore the counting of EV clocks $\phi$ is started. The binary counter 29 is reset by the $\overline{RESET}$ signal and the outputs $Q_0$ to $Q_4$ all become "0". The output of the NAND gate 30 becomes "0" every time the outputs $Q_0$, $Q_1$ and $Q_2$ are all "1". Accordingly, if any of the NOR gates 22 to 24 receives a signal "0" from the inverters 211 to 213 at this time point, it provides an output rising from "0" to "1". This operation is continued until the outputs $Q_3$ and $Q_4$ both become "1". This is because, after that the flip-flop 27 is set by the output from the NAND gate 31, the output thereof becomes "1".

During this operation, the outputs from the respective NOR gates 22 to 24 rise three times at most. That is, the counted value of the binary counters 32 to 34 takes any one of "00", "01", "10" and "11" (binary code), and at least one of the binary counters takes "11". Accordingly, the output (photocurrent) of the photodiodes 171 to 173 is quaternary-coded with reference to the maximum value (maximum luminance).

Figures 5A, 5B:
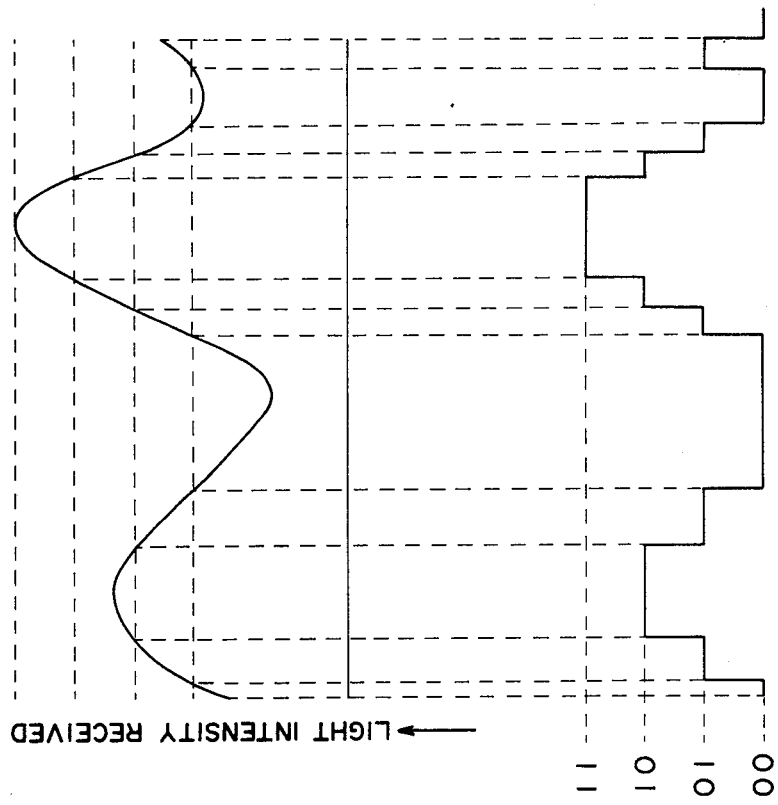
FIG. 5(a) and FIG. 5(b) are diagrams for explaining the quaternary-coding by the present invention.

FIG. 5(a) and FIG. 5(b) explain the quaternary-coding by the circuits as mentioned above. In FIG. 5(a), the photodiodes are arranged in the lateral direction and the level of the photocurrent output from the respective photodiodes is in the vertical direction. FIG. 5(b) shows how the photocurrent from the respective photodiodes is quaternary-coded, in which the scale of the axis of ordinates represents the outputs of the binary counters (these counters correspond to the binary counters 32 to 34 in FIG. 4).

The quaternary-coded signals thus obtained with reference to the maximum brightness are given into the shift registers corrsponding to the shift registers 12 and 13 in FIG. 2. In this case, in comparison with the binary-coded signals, much more information can be given so that a correct distance measurement becomes possible, without rendering the circuit structure so complicated.

On the other hand, a simple A/D conversion is performed by the real time instead of storing the maximum values during the capacitor charging by the photocurrent, therefore a short time process is possible. In more detail, according to the present invention, the maximum value is obtained not by comparing the respective outputs from all the photodiodes therebetween, but comparing them with the reference maximum luminance. Thus the photodiode radiated by the maximum luminance takes only the minimum integration time. Further as the difference in the luminance is taken out as the difference in the time, a simple A/D conversion can be performed within only a single integration time, which is much shorter than the time necessary for the system that the maximum value is temporarily memorized and then binary-, ternary- or n-coded. Accordingly, the processing time can be much saved.

In an application of the quaternary-coding as described in the above to a photography, the luminance is quaternary-coded in four stages, the top being the maximum luminance MAX and then reduced therefrom by one EV; (MAX)~(MAX−1EV), (MAX−(1EV)~-(MAX−2EV), (MAX−2EV)~(MAX−3EV) and (MAX−3EV) or less.

However, in the usual objects, the luminance range is very large from the lowest contrast within 0.5 EV to the highest contrast over 5 EV. To counter this, it is desirable, if used in an automatic focussing photography of a high yield, to quaternarycode by stepping by 0.25 EV taking the low contrast time when the output of the photodiode is not so variable as the reference time point. In spite of this, the distance measurement of the object of a high contrast is also possible and the yield of the camera is not degraded.

As described in the foregoing, according to the present invention, the distance measurement calculation is performed by using only the information around the maximum luminance. This calculation has a reasonable ground as mentioned below.

Ideally the luminance distribution of the object (within a distance measurement area) and that of the image (on a light receiving element train) have a relationship of 1:1. In fact, however, lens and mirrors are provided in the imagery course, the light receiving element itself has a certain dimension (this means that the output is rounded), and further the light receiving elements interfere with adjacent ones. As a result, the both luminance distributions do not always have the relationship of 1:1, and actually the bright part makes influence on the dark part. This can be easily understood if the photography is considered in the rear light. Accordingly, the distance mesurement calculation based on the information around the maximum luminance as in the present invention can assure a sufficiently good yield distance measurement.

Also, it is desirable to change the time interval of the EV clock signal $\phi$ in accordance with the width of the light strength on the light receiving element. When the width of the light strength on the light receiving element is relatively large, it is sufficient to satisfy the following relationship;

$$(T_n+1)/T_n = f(n)$$

where $T_n$ represents a time counting from the measurement starting until an n-th strobe is performed, $T_n+1$ represents a time counting from the measurement starting until an n+1-th strobe is performed, and f(n) is a function of n.

To the contrary, when the width of the light strength on the light receiving element is relatively narrow, it is sufficient to satisfy the following relationship.

$$T_{n+1} - T_n = f(n)$$

Figure 6A:
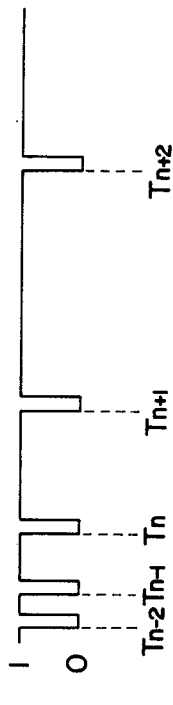
FIG. 6(a) and FIG. 6(b) are waveform diagrams of the EV block $\phi$ in FIG. 4.
Figure 6B:
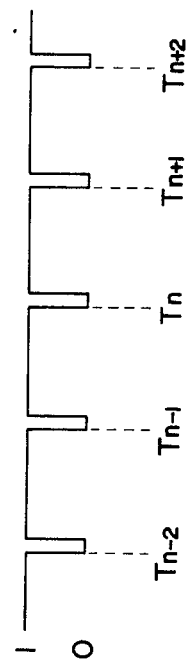

Here, FIG. 6(a) shows an example of the EV clock signal of the case of;

$$(T_n+1)/T_n = k \text{ (k: constant)}$$

and FIG. 6(b) shows an example of the case of;

$$T_{n+1} - T_n = k \text{ (k: constant)}$$

Though in the illustrated example the explanation is limited to the quaternary-coding, other coding such as ternary-coding, quinary-coding and so on may be explained similarly. Further, it should be noted that the light receiving element need not be limited to the photodiode.

As described in the foregoing, according to the present invention wherein the photocurrent is quantized with reference to the maximum value (maximum luminance) of the photocurrent, a correct distance measurement can be realized for a very limited time period by a simple structure.

What is claimed is:

1. In a range finder including a first and a second optical means for receiving light reflected by an object through different light paths so as to form images on a predetermined focal plane, a first and a second light receiving element trains in which a predetermined number of light receiving elements are arranged in correspondence to the images on said focal plane, and a first and a second quantizing means for quantizing the photocurrent in said respective light receiving elements in said first and second light receiving element trains and providing outputs, the corelation therebetween being used for determining the distance to be measured, the improvement characterized in that said first and second quantizing means quantize the photocurrent in said light receiving elements in said first and second light receiving element trains with reference to the maximum photocurrent in said light receiving elements in said first and second light receiving element trains.

2. A range finder according to claim 1 wherein said quantizing means comprises capacitors connected in series with said light receiving elements, respectively, and a plurality of couunter means each corresponding to each of said light receiving elements, which start the counting when an electric charges accumulated in said capacitor reaches to a predetermined value, and wherein all of said counter means stop the counting after a predetermined time of interval has lapsed from a time when one of counters starts the counting initially.

3. A range finder according to claim 2 wherein the quantizing is carried out according to the counting value of said counter means.

* * * * *